(12) United States Patent
Lucas

(10) Patent No.: US 9,964,640 B2
(45) Date of Patent: May 8, 2018

(54) METHOD FOR PHASE UNWRAPPING USING CONFIDENCE-BASED REWORK

(75) Inventor: Morrison R. Lucas, Lawndale, CA (US)

(73) Assignee: RAYTHEON COMPANY, Waltham, MA (US)

( * ) Notice: Subject to any disclaimer, the term of this patent is extended or adjusted under 35 U.S.C. 154(b) by 1178 days.

(21) Appl. No.: 13/304,945

(22) Filed: Nov. 28, 2011

(65) Prior Publication Data

US 2013/0135138 A1    May 30, 2013

(51) Int. Cl.
*G01S 13/90* (2006.01)

(52) U.S. Cl.
CPC .......... *G01S 13/9035* (2013.01); *G01S 13/90* (2013.01)

(58) Field of Classification Search
CPC .. G01S 13/9035; G01S 13/90; G01S 13/9094; G01S 2013/9041; G01S 13/9088
USPC .......................................... 342/127; 702/104
See application file for complete search history.

(56) References Cited

U.S. PATENT DOCUMENTS

| | | | |
|---|---|---|---|
| 5,783,942 A | | 7/1998 | Bernstein et al. |
| 5,835,055 A * | | 11/1998 | van der Kooij ............. 342/25 C |
| 5,923,278 A * | | 7/1999 | Poehler ............... G01S 13/9023 342/191 |
| 6,011,625 A * | | 1/2000 | Glass ............................ 356/496 |
| 6,016,057 A * | | 1/2000 | Ma ................................ 324/309 |
| 6,107,953 A * | | 8/2000 | Dwyer ................ G01S 13/9035 342/175 |
| 6,150,973 A | | 11/2000 | Pritt |
| 6,466,016 B1 * | | 10/2002 | Miyoshi ........................ 324/312 |
| 6,841,997 B2 * | | 1/2005 | Feiweier ....................... 324/307 |
| 6,891,370 B2 | | 5/2005 | Cline et al. |
| 7,372,393 B2 * | | 5/2008 | Yedidia ............... G01S 13/9035 342/195 |
| 2010/0045513 A1 * | | 2/2010 | Pett .......................... G01S 7/295 342/25 C |

(Continued)

OTHER PUBLICATIONS

Lo et al. "Surface normal guided method for two-dimensional phase unwrapping". Optik—International Journal for Light and Electron Optics. vol. 113, Issue 10. 2002. pp. 439-447.*

(Continued)

*Primary Examiner* — Matthew M Barker
(74) *Attorney, Agent, or Firm* — Lewis Roca Rothgerber Christie LLP

(57) ABSTRACT

A method, executed by one or more computers, for unwrapping phase wrapped data including a plurality of nodes. The method includes: selecting a root node from the plurality of nodes to start unwrapping (102); selecting next nodes to be unwrapped, from the neighbor nodes of the root node; dynamically calculating a confidence factor for each node being unwrapped (104); when a closed loop wherein one node can be unwrapped from either of two previously unwrapped nodes is encountered and an unwrapped value predicted by each of the prior nodes of the two nodes are different during unwrapping, comparing calculated confidence factors for the two previously unwrapped nodes (106); using the compared confidence factors of the two previously unwrapped nodes to determine which one of the two nodes is an erroneous node (108); and reprocessing the erroneous node to correct a previous unwrapping error (112).

15 Claims, 3 Drawing Sheets

(56) References Cited

U.S. PATENT DOCUMENTS

2011/0080471 A1* 4/2011 Song et al. ............... 348/46

OTHER PUBLICATIONS

Fang, et al., "Quality-Guided Phase Unwrapping Algorithm Based on Reliability Evaluation", Applied Optics, Optical Society of America, Washington, D.C. US, vol. 50, No. 28 Oct. 1, 2011 (pp. 5446-5452)
Heping, et al., "Path Following Algorithm for Phase Unwrapping Based on Priority Queue and Quantized Quality Map", Computational Intelligence and Software Engineering, 2009, CISE 2009, International Conference on, IEE, Piscataway,NJ, USA, Dec. 11, 2009 (pp. 1-4).
Hsu, et al., "Local Weight Selection for Two-Dimensional Phase Unwrapping", Image Processing, 1999 ICIP 99, Proceedings, 1999 International Conference on—Kobe, Japan, IEEE, Piscataway, NJ, USA, vol. 3, Oct. 24, 1999 (pp. 872-875).
Written Opinion of the International Searching Authority for International Application No. PCT/US2012/066163, filed Nov. 20, 2012, Written Opinion of the International Searching Authority mailed Aug. 9, 2013 (7 pgs.).
International Search Report for International Application No. PCT/US2012/066163, filed Nov. 20, 2012, International Search Report dated Aug. 2, 2013 and mailed Aug. 9, 2013 (4 pgs.).
International Preliminary Report on Patentability from Corresponding International Patent Application No. PCT/US2012/066163, filed Nov. 20, 2012, IPRP issued Jun. 3, 2014 and dated Jun. 12, 2014 (9 pgs.).

* cited by examiner

METHOD FOR PHASE UNWRAPPING USING CONFIDENCE-BASED REWORK

STATEMENT REGARDING FEDERALLY SPONSORED RESEARCH

This invention disclosure is related to a government contract. The U.S. Government has certain rights to this invention.

FIELD OF THE INVENTION

The present invention relates generally to imaging and other systems that use phase data, and more particularly to a method for phase unwrapping using confidence-based rework.

BACKGROUND

In many applications, electronic signals contain phase information, which when processed provide useful information, such as images, distances, velocities, topography maps, and the like. For example, a Synthetic Aperture Radar (SAR) system uses several radar scans from a source, such as an airplane or a satellite, to construct a topographic map of large areas of land. Similarly, received radar scan signals may be processed to determine the distance of a target from a receiving system.

Other applications that use phase information include magnetic resonance imaging (MRI), interferometry, X Ray crystallography, and optical Doppler tomography where the phase difference in the two received signals is used to measure the velocity of blood within a tissue.

Phase wrapping refers to phase values of greater than $2\pi$ or less than zero. When a measuring system measures phase values between 0 degrees and 360 degrees ($2\pi$ radians) and angles over $2\pi$ are registered as the difference between actual angle and 360 degrees, the phase measurement results in phase jumps, when there are phase angles greater than $2\pi$. Since the measuring system only measures angles between zero and $2\pi$, a resultant phase angle between zero and $2\pi$ may be "wrapped around" as an angle greater than $2\pi$. Determining whether a measured angle is within or outside the range of zero to $2\pi$ and correcting out-of-range values is referred to as phase unwrapping. It is desirable to perform phase unwrapping, because mathematical manipulations of the phase information (phase map) require continuity in the phase of measured signal, such as to correct field in homogeneities in MR applications or to generate accurate images using radar distance measurements.

Conventional phase unwrapping techniques consist of detecting node (pixel) locations of the phase discontinuities, finding an ordering among node locations for unwrapping the phase, and adding offsets of multiples of $2\pi$ to them. Phase unwrapping is computationally intensive and therefore is often performed by computationally powerful, off-line systems under user guidance.

Accordingly, there is a need for a fast, computationally efficient phase unwrapping methodology for correcting phase jumps for phase information-based applications.

SUMMARY

In some embodiments, the present invention is a method, executed by one or more computers, for unwrapping phase wrapped data including a plurality of nodes. The method includes: selecting a root node from the plurality of nodes to start unwrapping; selecting next nodes to be unwrapped, from the neighbor nodes of the root node; dynamically calculating a confidence factor for each node being unwrapped; when a closed loop wherein one node can be unwrapped from either of two previously unwrapped nodes is encountered and an unwrapped value predicted by each of the prior nodes of the two nodes are different during unwrapping, comparing calculated confidence factors for the two previously unwrapped nodes; using the compared confidence factors of the two previously unwrapped nodes to determine which one of the two nodes is an erroneous node; and reprocessing the erroneous node to correct a previous unwrapping error.

In some embodiments, the present invention is a method, executed by one or more computers, for unwrapping phase wrapped data including a plurality of nodes. The method includes: selecting a root node from the plurality of nodes to start unwrapping; generating a list of unwrappable nodes neighboring the selected root node; unwrapping a current node selected from the generated list; generating a confidence factor for the unwrapped current node; checking whether the unwrapped current node includes multiple predecessor nodes; when there are multiple predecessor nodes, comparing unwrapped values of the predecessor nodes leading to the multiple predecessor nodes; when there are no multiple predecessor nodes, adding the current node to the list of unwrappable nodes neighboring the current node; comparing unwrapped values of the predecessor nodes of the current node; when there is no match from the comparison of the unwrapped values, comparing confidence factors of the predecessor nodes of the current node; determining an erroneous node based on the comparison of the confidence factors; reprocessing the erroneous node to correct a previous unwrapping error; and when there is a match from the comparison of the unwrapped values, adding the current node to the list of unwrappable nodes neighboring the current node.

DETAIL DESCRIPTION

Figure 1:
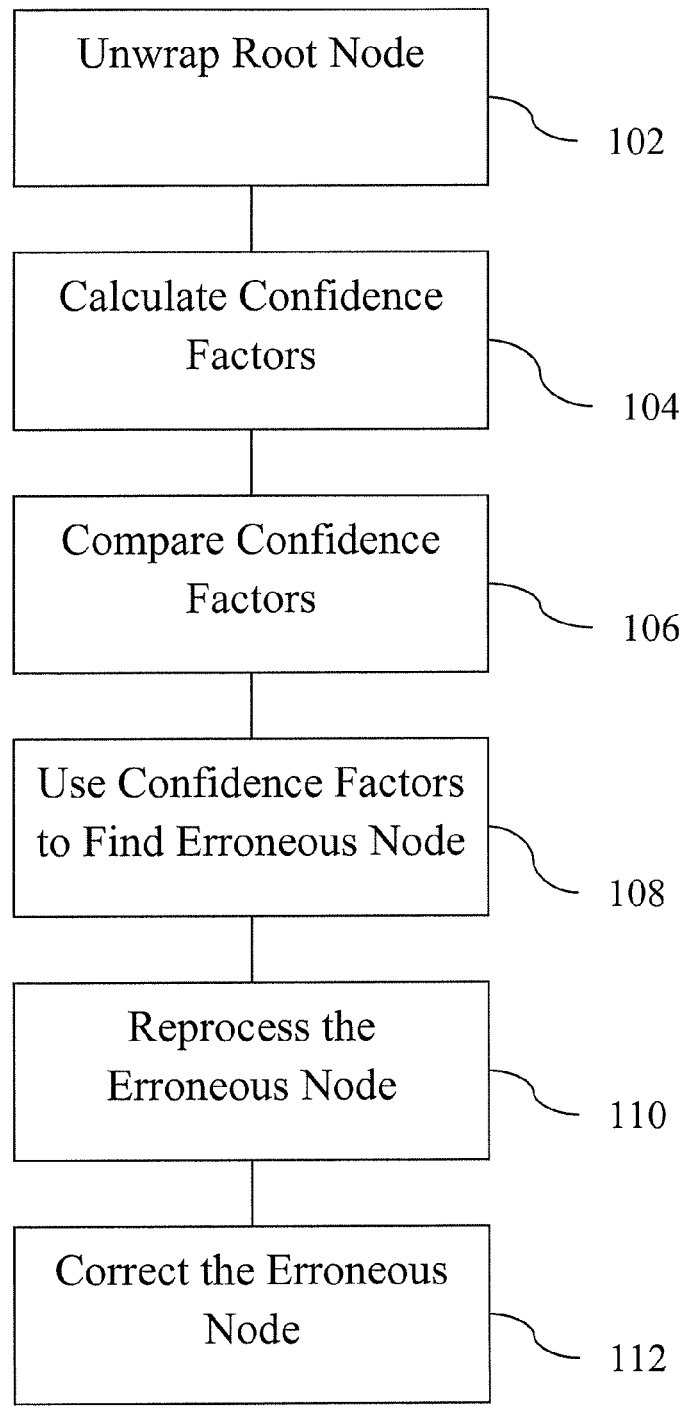
FIG. 1 shows an exemplary phase unwrapping process flow executing on one or more computers, according to some embodiments of the present invention.

The present invention is directed to a method executed by one or more computers for unwrapping phase wrapped data, for example from a radar system, to correspond to a range measurement. As a result, the unwrapped phase data are considered to be pixel values of the corresponding physical geometry. The unwrapped phase data is angular measurements typically expressed in radians. The unwrapped angular measurements in radians can be converted to linear measurements by multiplying the angular measurement by $\lambda/2\pi$ in which $\lambda$ is the length or dimension of $2\pi$ radians. In radar phase data, $\lambda$ is proportional to the wavelength of the radar signals used to generate the unwrapped phase data and the unwrapped radar phase data can be converted into distance measurements in feet or meters by multiplying the unwrapped radar data by $\lambda/2\pi$.

One skilled in the art would readily recognize that the method of the present invention may be executed by any processor-based system, including a stand-alone computer, a system with a single processor or multiple processors, an Internet-based system, or the like. The processor-based system would include one or more processors and memories for carrying out instructions to implement the method, a display monitor to display information to the user and an input device to take inputs from the user, or data generation systems, such as a radar system.

In some embodiments, the present invention uses a quality guided path following method with rework of nodes after they have been processed, using a dynamically calculated confidence factor (estimate) for each node. This allows faster, less careful initial unwrapping and represents a better performance point for low noise systems. Furthermore, the present invention provides support for dynamic estimation of structured errors, as appropriate for the underlying system. This allows improved performance in systems where significant correlated errors are expected. This way, a "just-in-time" confidence determination is performed as the nodes are being processed, rather than pre-determined "quality maps" of the conventional methods.

In accordance with some embodiments of the invention, a quick phase unwrapping methodology is applied to the phase wrapped data to obtain unwrapped data, which is expected to include some areas of error. As the nodes are being processed for phase unwrapping, a confidence factor for each node is dynamically calculated and maintained. That is, a confidence factor from each predecessor node is computed, however, the higher confidence factor is maintained. When a closed loop is encountered, the unwrapped value of the node closing the loop can be computed from each of two adjacent nodes. If the unwrapped values do not match, then the predicted confidence factors of the newly processed node are used to determine the erroneous prior node. That is, the prior node which produces a lower confidence factor on the newly processed node is determined to be the erroneous node. The method of the invention reprocesses the erroneous prior node. Recursively applying this process has the effect of working backwards along the erroneous path until a higher confidence region is found. This way, the reprocessing (according to the confidence factors) is performed only to resolve errors when they are found, rather than maintaining a sorted list of nodes to unwrap, according to the conventional methods.

FIG. 1 shows an exemplary phase unwrapping process flow executing on one or more computers, according to some embodiments of the present invention. The method of the invention starts with a root node and unwraps its neighbors, in block 102. Note that the root node is unwrapped by definition. In some embodiments, root node selection is application dependent. A root node is selected to minimize total unwrap path lengths (i.e. central node), and/or to minimize likelihood of ambiguous unwrap operations in the first few steps (i.e. portions of the node map which are known apriori to be well behaved). The method then moves to neighbors of previously unwrapped nodes, unwrapping each in turn based on their previously unwrapped neighbors.

A confidence factor is dynamically calculated for each unwrapped node while it is being unwrapped, in block 104. When a closed loop (a closed loop is when one node can be unwrapped from either of two previously unwrapped nodes) is encountered and the unwrapped values predicted by each of the prior nodes of the two nodes are different, the predicted confidence factors for the two nodes are compared, in block 106. The confidence factors of the two nodes are used to determine which one of the two nodes is the erroneous node, in block 108. For example, the node with the lower confidence factor is determined to be the erroneous node.

The erroneous node is re-unwrapped using the newly derived data (more unwrapped neighbors. The newly derived data will generally result in different unwrapped values and different slope estimates. Repeatedly applying this process has the effect of reprocessing backward, along the path of the erroneous node, until a high confidence region is identified. This generally has the effect of unwrapping backward to a bad measurement or noisy region. A bad transition is determined as the node where the confidence becomes high.

In some embodiments, nodes which require reprocessing are added to the front of the queue. This tends to limit the impact of previous error by correcting them as soon as possible.

In some embodiments, no node is added more than N times (a predetermined integer value). This is generally needed when a complete failure is occurring.

In some embodiments, the method of the present invention uses a breadth-first node exploration method. In this method, a queue of nodes to be processed is established. A first node is read from the queue and is processed based on its already processed neighbor nodes. The unprocessed nodes are added to the back of the queue and the process continues until all (or the desired number of) the nodes are processed. As long as the neighbor map is sufficiently connected, all nodes will be processed thus, the breadth-first node exploration method naturally heels around dead elements or missing measurements.

In some embodiments, if when a closed loop is identified where all previously processed neighbors produce the same unwrapped value, the highest propagated confidence value is chosen. This tends to limit the effect of low confidence steps which nonetheless result in a correct unwrapped value.

Figure 2:
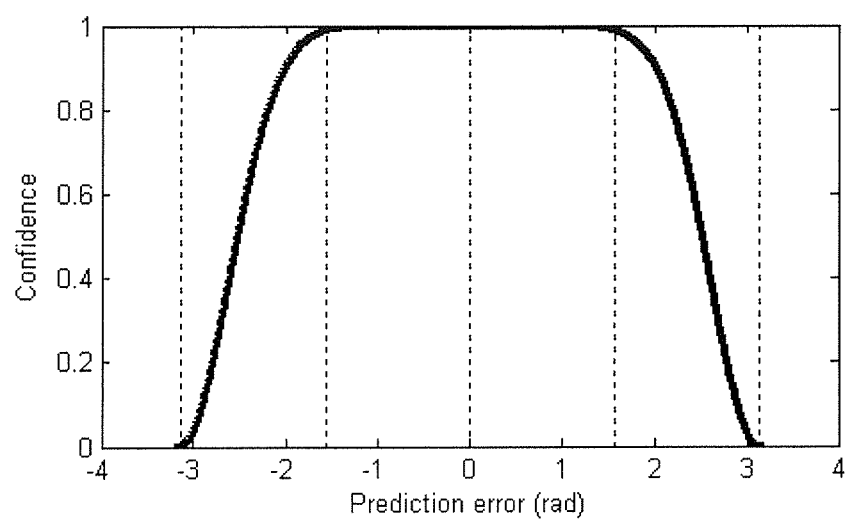
FIG. 2 shows a graph for exemplary values of confidence factor versus prediction error according to some embodiments of the present invention.

FIG. 2 shows a graph for exemplary values of confidence factor versus prediction error according to some embodiments of the present invention. The example shows a perfect confidence factor of "1" when the unwrapped prediction generated by a previously processed node perfectly matches the unwrapped value, and a no confidence factor of "0" when the unwrap prediction is in error by $\pi$ radians. The curve decreases from one to zero monotonically as the absolute error decreases. The shape of the curve indicates relatively high confidence for all values with an absolute prediction error of less than $\pi/2$.

In some embodiments, the confidence factor of the root node is set to 1, as an initial condition. Unexpected phase values of $+/-\pi/2$ are high confidence factors as depicted in FIG. 2. Also, the confidence factors always decrease as the unwrapping propagates, since the confidence factor of a previous node is multiplied by a number between 0 and 1 (i.e., less than 1) to obtain the confidence factor of the current node.

In some embodiments, the method of the present invention uses both a-priori knowledge and the state of the previously processed neighboring nodes to predict expected measurement values. For example, the confidence factor of an unwrapped node is defined based on how well the state of a previous node predicts the unwrapped phase of the current node. "State" in this case refers to the unwrapped value, raw measurement, any apriori information about the current and previous node, and the state of any just in time estimators. The invention then applies an integer number of 2π adjustments to the measurement until the adjusted value most closely matches the predicted value ("PREDICT"). The best estimated value is determined to be the projection of the state of the neighboring node to the current node. The state of a node includes initial measurement, unwrapped value, a-priori knowledge of the underlying system (e.g., expected array geometry or apriori terrain knowledge). For example:

Confidence_factor_of_current_node=confidence_factor_of_
previous_node*confidence_of_current_processing_step, (1)

Confidence_of_current_processing_step=a lookup
table(for example, of FIG. 2),based on prediction error, (2)

Prediction_error=(unwrapped_value_prediced_
from_prior_node)−
(best_unwrapped_result_after_applying_2pi_adjustments),
where,(best_
unwrapped_result_after_applying_2pi_
adjustments)=PREDICT (3)

In some embodiments, a dynamic state estimator aids the unwrapping process for large error sources due to an understood and expected process. For example, a smooth phase slope can be estimated by augmenting each node with a slope X and a covariance P estimate. The root node is initialized with X=[0; 0], and P=[$1^{e\ 5}$ 0; 0; $1^{e\ 5}$]. It is noted that these values are not fixed, and any large numbers will work. The slope estimation is propagated from node to node during the unwrapping process based on the following:

$$X'=X+K(Z-HX) \quad (4), \text{ and}$$

$$P'=(1/F)(I-KH)P \quad (5),$$

where, X' is the slope of the current (new) node, P' is the covariance of the current node, F is a constant, hereinafter called "forgetting factor," H is element orientation (a-priori ([2×1]), Z is the unwrapped value of the current (new) node, and:

$$K=PH'/(F+HPH'[2\times1]) \quad (6),$$

where, H' is the element orientation of the current node, where I is an (2×2) identity matrix.

The forgetting factor F reduces the effect of distant data and thus allows the slope to be more responsive to the more immediate previous nodes. The values of X' and P' are stored for subsequent use. The slope is part of the state of each node, as described above. Slope times apriori position is added to the previous unwrapped value to get the predicted value at the current node. Covariance is used to help determine the slope of the future nodes. Confidence factor is calculated from the predicted, unwrapped value, which is adjusted by the slope estimate. Erroneous nodes are then determined when multiple predicted values lead to different unwrapped results, as described above.

Figure 3:
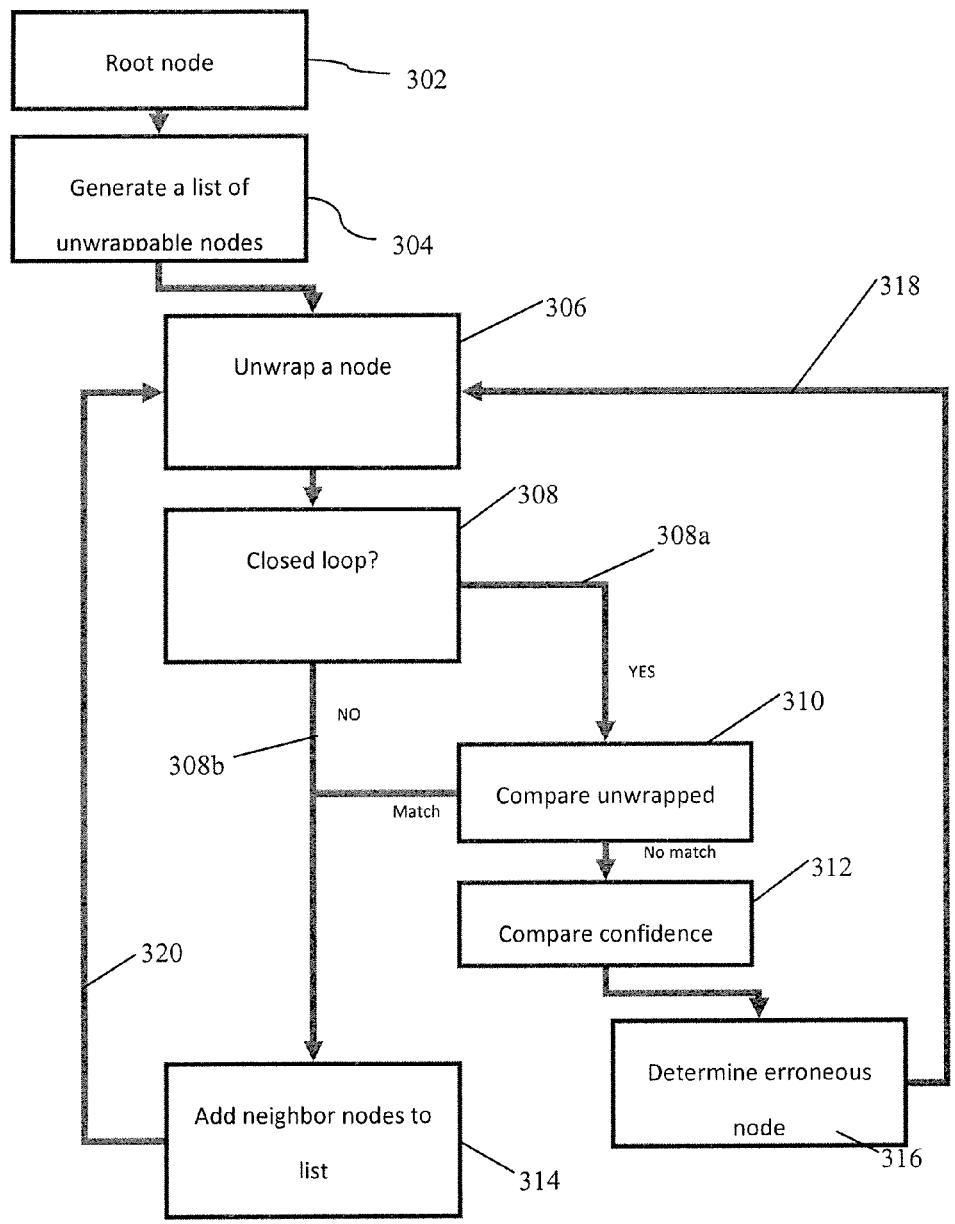
FIG. 3 depicts an exemplary phase unwrapping process flow executing on one or more computers, according to some embodiments of the present invention.

FIG. 3 depicts an exemplary phase unwrapping process flow executing on one or more computers, according to some embodiments of the present invention. As shown, a root node, which by definition is unwrapped, is selected in block 302. A list of unwrappable nodes neighboring the selected node is then generated in block 304. In block 306, a node from the generated list is selected and unwrapped. The unwrapping of the node involves generating an unwrapped value, calculating a confidence factor, and determining (calculating) a state including a slope. In block 308, it is checked whether the unwrapped node closes a loop, that is, has multiple predecessor nodes. If yes (308a), the current node is unwrapped independently using each of the predecessor nodes, and the resulting unwrapped values are compared, in block 310. If it is determined that the unwrapped node does not close a loop (308b), the process proceeds to block 314, in which the neighbors of the current node are node are added to the list of unwrappable nodes, and the next node in the list is then processed (320).

If the resulting unwrapped values computed from each of the predecessor nodes do not match for the comparison of the unwrapped values in block 310, the confidence factors of the current node as computed from each predecessor node are compared in block 312. The invention then uses the comparison result of the confidence factors to determine which (predecessor) node is the erroneous node, in block 316. That is, the invention uses the unwrapped values to determine whether an erroneous node exists, and uses the confidence factor to determine which node is the erroneous node, after the existence of one is determined. The erroneous node is then reprocessed (318) in block 306. If the resulting unwrapped values computed from each of the predecessor nodes do match, then the process proceeds to block 314, in which the neighbors of the current node are node are added to the list of unwrappable nodes, and the next node in the list is then processed (320).

In the case of the phase data being generated by a radar with multiple independent subarrays (a measurement could be from a special purpose beacon, or any other type of target or terrain), a potentially large source of error is per-subarray phase changes due to changes in the long RF cables connecting the subarrays or variations in the electronics. In this case, a consistently unwrapped error may be acceptable, so long as the same error is made for all measurements within a subarray. Accordingly, the method of the present invention unwraps data from the multiple measurements and maintains a best estimate of the phase offset for each subarray. In this case, the state information is maintained between the beacons, and the data is updated whenever a subarray crossing is observed, noting that subarray boundaries are known apriori, based on the design of the system. In some embodiments, one scalar (phase) is used per subarray. The method then adjusts the predicted unwrapped value by this offset.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope and spirit of the invention as defined by the appended claims.

What is claimed is:

1. A method, executed by a radar system, for unwrapping phase wrapped distance measurement data of a radar return signal, the method comprising:
transmitting a radio frequency (RF) signal toward a target;
receiving a return signal reflected from the target;
detecting from the return signal a plurality of pixel locations of a geometry of the target as a plurality of phase wrapped nodes;
selecting a root node from the plurality of nodes;
determining neighbor nodes of the root node from the plurality of pixel locations of the geometry of the target;
selecting next nodes to be unwrapped, from the neighbor nodes of the root node;
starting to unwrap said next nodes;
dynamically calculating a confidence factor for each node being unwrapped;
when a closed loop wherein a current node can be unwrapped from either of two previously unwrapped nodes is encountered and unwrapped values for the current node predicted based on each of the two previously unwrapped nodes are different, comparing calculated confidence factors for the current node based on the two previously unwrapped nodes;

using the compared confidence factors of the current node to determine which one of the two previously unwrapped nodes is an erroneous node;

reprocessing the erroneous node to correct a previous unwrapping error to generate unwrapped data, the unwrapped data representing pixel values of the geometry of the target;

converting the generated unwrapped data to distance measurement data for the target; and transmitting the distance measurement data to be displayed on a display.

2. The method of claim 1, wherein a node with a lower confidence factor is determined to be the erroneous node, based on the compared confidence factors.

3. The method of claim 1, wherein the phase wrapped distance measurement data is radar distance measurement data, the method further comprising receiving the phase wrapped radar distance measurement data from a radar.

4. The method of claim 1, further comprising propagating the confidence factor from a node of the two previously unwrapped nodes, which results in a highest confidence factor.

5. The method of claim 1, wherein the selecting next nodes to be unwrapped uses a breadth-first node exploration method, wherein a queue of nodes to be unwrapped is established, the next node is read from the queue and is unwrapped based on its already processed neighbor nodes, and wherein wrapped nodes are added to a back of the queue and the process continues until a desired number of the nodes are unwrapped.

6. The method of claim 1, further comprising augmenting each node with a slope X and a covariance P estimate; and propagating a slope estimation of an augmented node with the confidence factor of the augmented node to a next node.

7. The method of claim 6, wherein the propagating a slope estimation is based on calculating the following:

$$X'=X+K(Z-HX), \text{ and}$$

$$P'=(1/F)(I-KH)P,$$

where, $X'$ is a slope of a next node, $P'$ is a covariance of the next node, F is a constant, H is an element orientation, Z is the unwrapped value of the next node, and:

$$K=PH'/(F+HPH'[2\times1]),$$

where, $H'$ is the element orientation of the next node, and I is an identity matrix.

8. The method of claim 6, wherein the confidence factor of the next node is calculated by multiplying the confidence factor of the augmented node by a confidence factor of the unwrapping process for the next node.

9. The method of claim 8, wherein the confidence factor of the unwrapping process for the next node is determined based on a predetermined look up table and a prediction error for the augmented node.

10. A method, executed by a radar system, for unwrapping phase wrapped distance measurement data of a radar return signal, the method comprising:

transmitting a radio frequency (RF) signal toward a target;

receiving a return signal reflected from the target;

detecting from the return signal a plurality of pixel locations of a geometry of the target as a plurality of phase wrapped nodes;

selecting a root node from the plurality of nodes;

generating a list of unwrappable nodes neighboring the selected root node from the plurality of pixel locations of the geometry of the target;

unwrapping a current node selected from the generated list;

generating a confidence factor for the unwrapped current node;

checking whether the unwrapped current node has multiple predecessor nodes;

when there are multiple predecessor nodes, comparing unwrapped values of the current node based on the predecessor nodes leading to the multiple predecessor nodes;

when there are no multiple predecessor nodes, adding the current node to the list of unwrappable nodes neighboring the current node;

when there is no match from the comparison of the unwrapped values, comparing confidence factors of the current node based on the predecessor nodes;

determining an erroneous node based on the comparison of the confidence factors;

reprocessing the erroneous node to correct a previous unwrapping error;

when there is a match from the comparison of the unwrapped values, adding the current node to the list of unwrappable nodes to generate unwrapped data, the unwrapped data representing pixel values of the geometry of the target;

converting the generated unwrapped data to distance measurement data for the target; and transmitting the distance measurement data to be displayed on a display.

11. The method of claim 10, wherein the unwrapping of the current node includes generating an unwrapped value, and determining a state including a slope.

12. The method of claim 10, wherein a node with a lower confidence factor is determined to be the erroneous node, based on the compared confidence factors.

13. The method of claim 10, further comprising augmenting each node with a slope X and a covariance P estimate; and propagating a slope estimation of an augmented node with the confidence factor of the augmented node to a next node.

14. The method of claim 13, wherein the propagating a slope estimation is based on calculating the following:

$$X'=X+K(Z-HX), \text{ and}$$

$$P'=(1/F)(I-KH)P,$$

where, $X'$ is a slope of a next node, $P'$ is a covariance of the next node, F is a constant, H is an element orientation, Z is the unwrapped value of the next node, and:

$$K=PH'/(F+HPH'[2\times1]),$$

where, $H'$ is the element orientation of the next node, and I is an identity matrix.

15. The method of claim 10, wherein the confidence factor of unwrapping a next node in the generated list is determined based on a predetermined look up table and a prediction error for the current node.

* * * * *